US006810388B1

(12) United States Patent
Sato

(10) Patent No.: US 6,810,388 B1
(45) Date of Patent: Oct. 26, 2004

(54) DIGITAL CONTENTS COPYING INHIBITION APPARATUS, DIGITAL CONTENTS COPYING INHIBITION METHOD, AND COMPUTER PRODUCTS

(75) Inventor: Yasutaka Sato, Tokushima (JP)

(73) Assignee: Trinity Security Systems, Inc., Tokyo (JP)

( * ) Notice: Subject to any disclaimer, the term of this patent is extended or adjusted under 35 U.S.C. 154(b) by 394 days.

(21) Appl. No.: 09/587,360

(22) Filed: Jun. 2, 2000

(30) Foreign Application Priority Data

Mar. 24, 2000 (JP) ........................................ 2000-084913

(51) Int. Cl.⁷ ............................ G06F 17/60; H04K 1/00; H04L 9/00
(52) U.S. Cl. ............................................ 705/57; 380/94
(58) Field of Search ............................. 705/57; 385/94

(56) References Cited

U.S. PATENT DOCUMENTS

| 6,009,170 A | * | 12/1999 | Sako et al. | 705/57 |
| 6,108,423 A | * | 8/2000 | Sako et al. | 713/193 |
| 6,185,687 B1 | * | 2/2001 | Sako et al. | 713/200 |
| 6,212,325 B1 | * | 4/2001 | Kori | 380/201 |
| 6,256,392 B1 | * | 7/2001 | Sako et al. | 380/203 |
| 6,278,836 B1 | * | 8/2001 | Kawara et al. | 386/94 |
| 6,289,103 B1 | * | 9/2001 | Sako et al. | 380/201 |
| 6,389,137 B1 | * | 5/2002 | Sugita et al. | 116/210 |
| 6,539,065 B1 | * | 3/2003 | Furukawa | 375/316 |
| 2001/0033739 A1 | * | 10/2001 | Ogura et al. | 386/94 |

FOREIGN PATENT DOCUMENTS

| JP | PCT/JP99/01338 | 3/1999 |
| JP | 11-195268 | 7/1999 |

* cited by examiner

*Primary Examiner*—Firmin Backer
(74) *Attorney, Agent, or Firm*—Foley & Lardner LLP

(57) ABSTRACT

The digital contents copying-inhibition apparatus comprises a guard data storage section which stores a guard data. This guard data is for appending to audio or video digital data which can be expressed as amplitude of the contained frequency component. Presence of this guard data becomes apparent only when the audio or video digital data is reproduced after the data has been compressed once. The apparatus further comprises, a peak detection section which identifies a position of a digital value having a prespecified increase rate and a prespecified amplitude among a plurality of digital values each constituting the digital data, a data analysis section which sets a flag for a digital value located at a position away from the peak position by a prespecified number and also sets a plurality of digital values within a prespecified range centering on the digital value for which the flag has been set as a data pattern, and a guard data appending section which identifies a position where the data pattern is located from the digital data and varies the digital data by appending the guard data to the identified position.

18 Claims, 11 Drawing Sheets

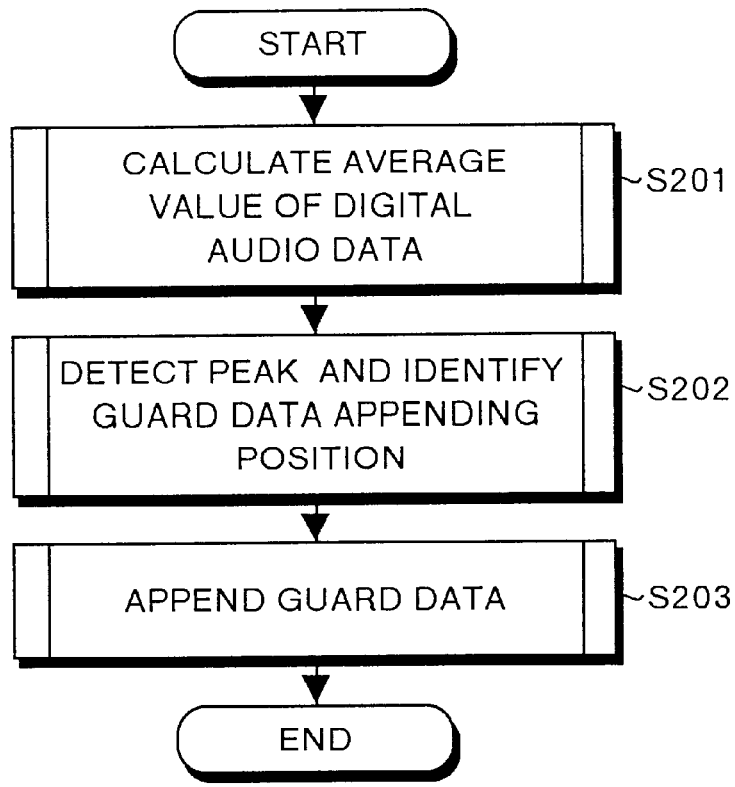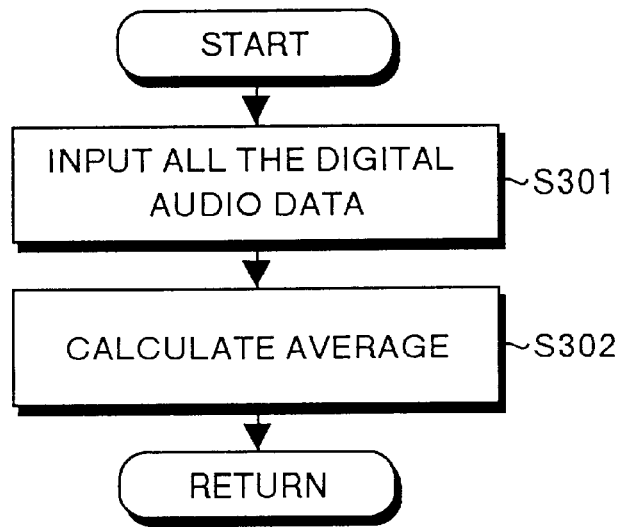

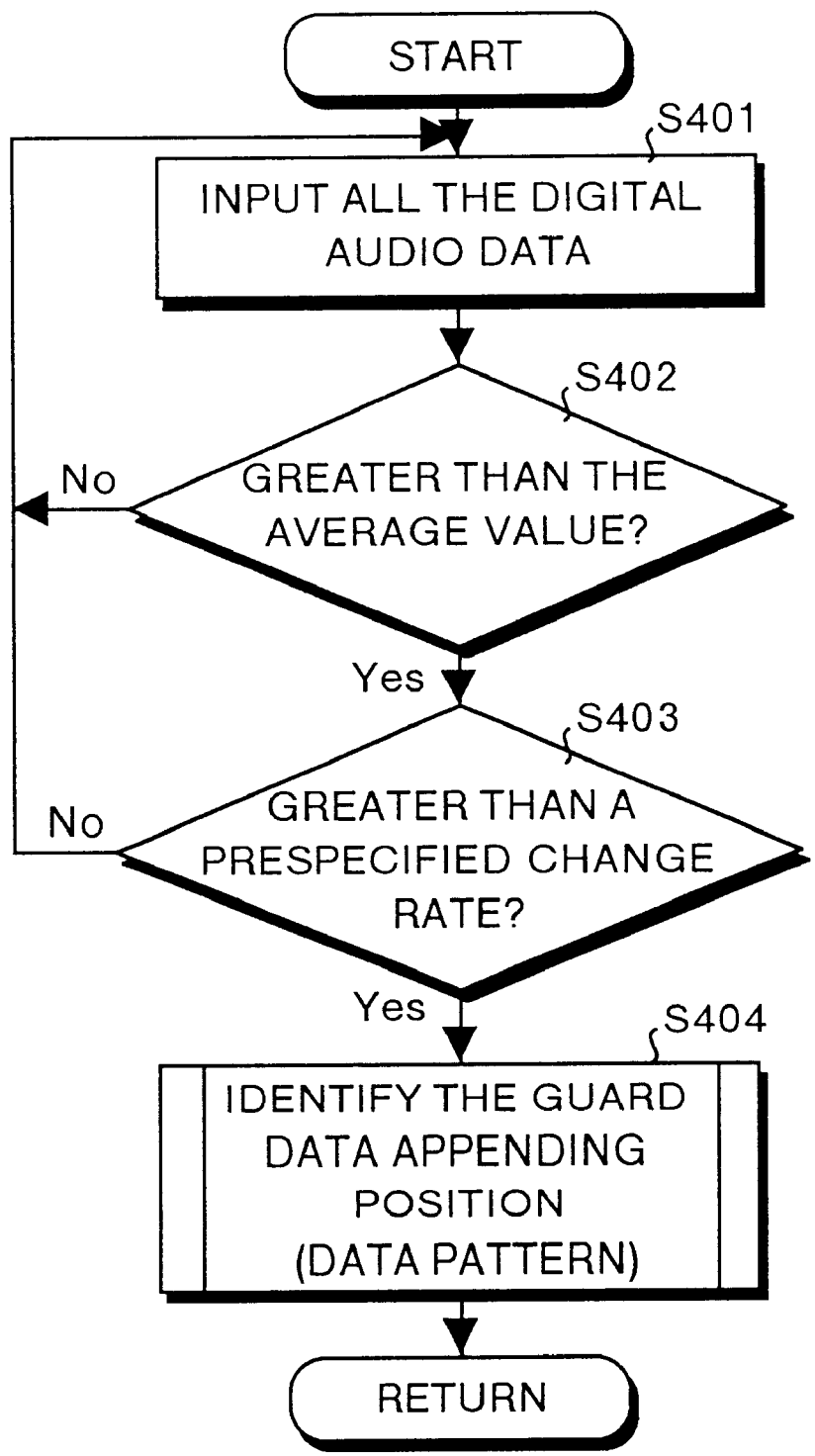

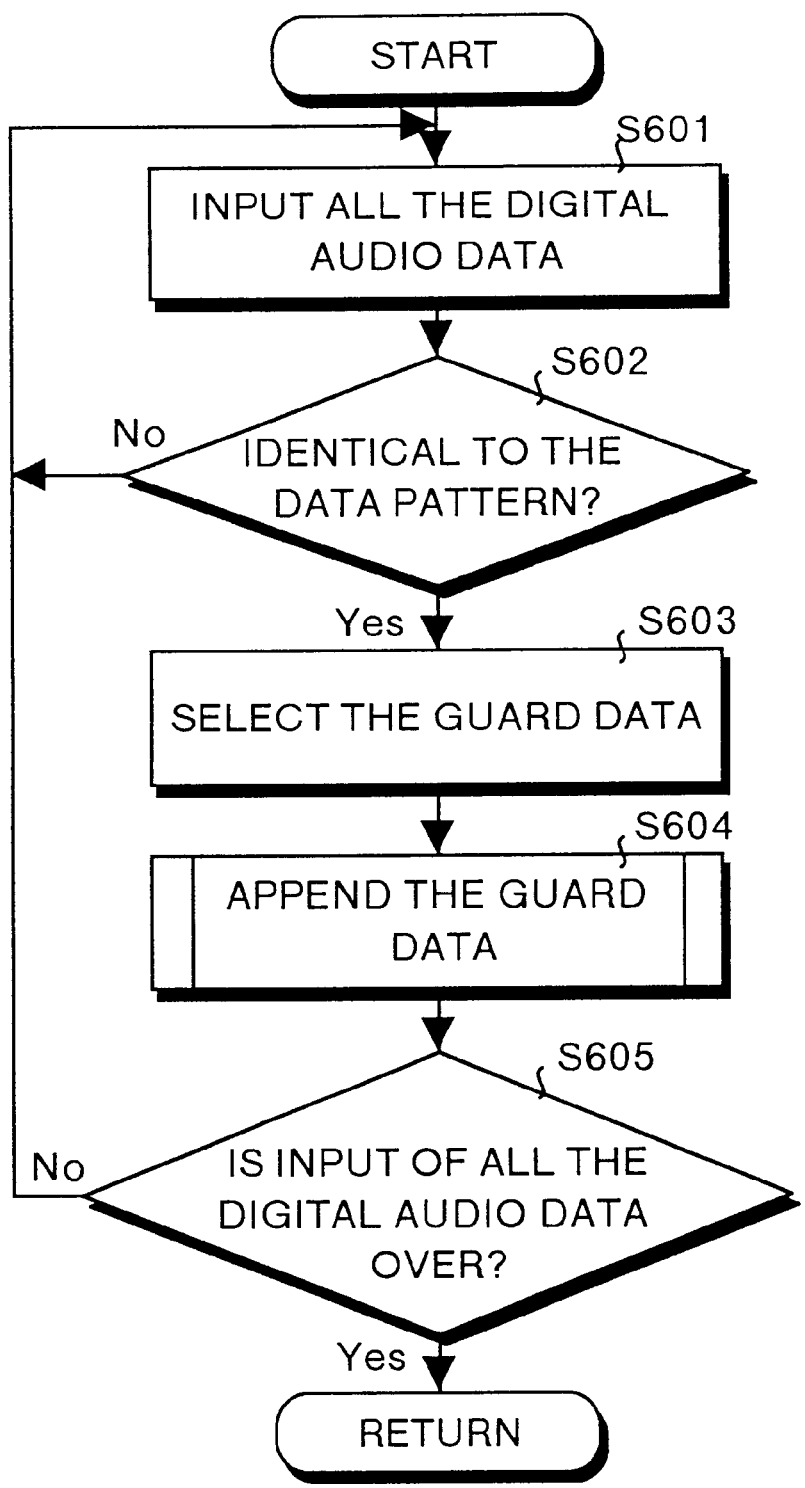

DIGITAL CONTENTS COPYING INHIBITION APPARATUS, DIGITAL CONTENTS COPYING INHIBITION METHOD, AND COMPUTER PRODUCTS

FIELD OF THE INVENTION

The present invention relates to a digital contents copying inhibition apparatus which can prevent digital contents recorded in a music CD, a CD-ROM or the like from being copied into various types of recording media for inhibition of illegal distribution of the digital contents, a reproducible recording medium in which the digital data processed by the apparatus is recorded, a digital contents copying inhibition method, and a computer-readable recording medium in which a program for making a computer execute the method is recorded, and further to a reproducible recording medium in which the digital data processed by the method is recorded.

BACKGROUND OF THE INVENTION

In recent years, because of the development in the fields of semiconductor integrated circuits and digital signal processing technology, size and cost of devices have been remarkably reduced, and especially in the field of entertainment, it has been becoming increasingly easier to enjoy contents of music or video images.

For example, in the case of musical contents, with consolidation of communication infrastructure, utilization of music provision services via wireless communications such as broadcasting or via a cable network has been becoming easier, but this type of services presume the real time utilization, so that the services do not sufficiently satisfy desires and needs of each audience, and are also restricted in terms of time and place. In order to make it possible for each user to enjoy a desired music at a desired time, it is necessary to store musical contents in recording media and distribute the recording media to each user. Such a system is beneficial not only for users, but also for providers of musical contents.

Records in which voice and sound recorded therein as analog signals which are expressed by irregularities in a spiral continuous groove and a magnetic disk with the analog signals for voices and sounds as changes in magnitude of magnetism were used for a long time. However, now days a music CD in which voice and sound are recorded in the form of digital bit arrays are widely used because it is excellent in portability and music reproducibility. With advent of the music CD, remarkable progresses has been made in the technology of recording and reproducing music as digital contents. Now a days, musical contents is provided with various types of recording media including the music CD such as DAT (Digital Audio Tape) or MD (Mini Disk).

Magnetic recording system is employed in DAT or MD. Therefore, a recording devices for such media can be provided at a relatively low price. The users can digitally record audio signals in these media. This means that musical contents provided with such media as the music CD can be copied into such media as a DAT and an MD because of its high reproducibility of digital data.

On the other hand, in the case of video contents, in association with popularization of scanners and digital cameras, there is now the general tendency for storing picture images or video images recorded on the conventional type of light-sensing films as a file (for still images and moving images) so that the image data can be searched for, managed, or edited later. Further, with appearance of low price and high quality printers, it has become possible to crease various types of designs such as drawings or drafts on a computer and print out the designs or to prepare and reproduce a computer animation film. Further, the digital image file can be recorded in a CD-ROM based on the same specifications as those for the music CD, and can be distributed in a wide area.

Also in recent years, in association with progress in computerization, number of end users has been rapidly increasing, and personal computers and peripheral devices for the computers have been provided with low prices. In this situation, it is possibly not only to reproduce a music CD with a computer, but also to easily obtain various recording media such as a hard disk or a CD-R each enabling storage of a relatively large volume of data.

An application program which is originally prepared for operating on a computer is also a type of digital contents. Such an application program is stored in a CD-ROM. Thus, the application program is not different from musical data stored in a music CD or digital image file in the point that the application program is digital data.

Popularization of computers and supply of digital contents together make it possible to copy musical data recorded in a music CD or a digital image file and an application program recorded in such recording media as a CD-ROM can into a hard disk, a CD-ROM or the like via a computer.

With rapid popularization of Internet and progress in the technology for compression of musical data or an image file, it has become easy to distribute the digital contents through a network, and the digital contents can be maintained and controlled only with a computer without purchasing a dedicated recording medium such as a music CD or a CD-ROM. In other words, at present, digital contents can easily be obtained and copied with a computer.

Further, it is possible to copy contents stored in some specific recording media such as a CD-ROM for game which is originally not intended to be reproduced on a personal computer via a personal computer into a CD-R. Such illegally copy of the digital contents has created a social problem.

In order to prevent digital contents from being illegally copied, various types of copying inhibition technologies have been developed and put into practical use. As a first example thereof, a recording device enabling storage making it possible to record digital data for a DAT or an MD has a copying inhibition function called as SCMS (System Copy Management System) from a view point of copy right protection. This copying inhibition function is realized by recording code (a copying inhibition bit) for inhibition of copying in a recording area for control on DAT or MD. For instance, at first, when recording (copying) is executed for MD, a copying inhibit bit indicating that copying is allowed only once is written therein. When recording is tried by a user using the MD with digital contents and the above-described copying inhibition bit written and copied therein as a copied medium, the user's recording device detects the copying inhibition bit, and inhibits recording. Namely, with this function, generation of additional copies is prevented.

As a second example of the copying inhibition function, there is known the ID code authorization method in which input of ID code is required when an application program stored in a CD-ROM is installed in a computer. When this method is employed, unless a user who has obtained a CD-ROM through a legal route acquires the ID code from the provider of the CD-ROM and input the ID code, installation of the CD-ROM is never completed. With this feature, a user who obtained only a CD-ROM illegally copied can not execute the application program, which in turn prevent distribution of illegal copies.

Especially when executing shareware distributed through a network, in most cases, a password which corresponds to the ID code described above is required to cancel inhibition of trial use, and this password can be acquired by paying a fee or the like to a provider of the shareware. In the case of shareware, however, as it is allowed to freely download shareware from a server on the network, which means in a broad sense that it is allowed to freely copy the shareware, so that the authorization of a user with a password is not for preventing digital data from being copied.

Further, there is a case where the ID code is recorded in a CD-ROM and input of ID code by the user is not required. For instance, in a case of a game machine, the ID code is recorded in a pregap section in the utmost inner groove of a CD-ROM for game machine, and the game machine determines by reading the ID code recorded in the pregap section whether the CD-ROM is a legal one or not. Any data can not be read out from, nor written in this pregap section with an ordinary CD-R drive which can be used in a personal computer, and as a result, a CD-ROM for game machine is prevented from being illegally copied.

As a third example of the copying inhibition technology, the ciphering technology is known. In the ciphering technology, digital data which is a collection of FIGS. 0 and 1 is mathematically converted so that the ciphered data can not be deciphered without using a particular key and algorithm. In other words, even when digital contents having been subjected to ciphering is obtained, so long as the key is not acquired, the digital contents can not correctly be reproduced, which prevents distribution of illegal copies of the digital contents.

As a fourth example of copying inhibition technology, the electronic watermark technology is known. In this technology, specific information such as copy right is buried in the entire digital contents to enable identification of a source of an illegal copy or detection of falsified data, and this technology utilizes the fact that musical data or image data include a portion or portions which can not be sensed by human.

The copying inhibition technologies described above have problems as described below. The copying inhibition function of a recording apparatus described as the first example above can prevent repetition of illegal operations for copying between recording apparatus each having the copying inhibition function, but when digital contents is recorded via a computer in a hard disk or in other types of media, it is easy to suppress the function, and in that case, illegal operations for copying the original contents can be repeated endlessly.

For instance, even in a case of DAT or MD in which a copying inhibition bit is written in with a recording apparatus, it is easy to prepare a program which can ignore presence of the copying inhibition bit when a regenerated signal (a digital signal or an analog signal) outputted from a device for reproducing the DAT or MD is recorded in a recording media such as a hard disk.

Especially, this copying inhibition function is not for modifying digital contents for inhibition of copying, and the copying inhibition bit is introduced only as a flag, so that an operation for copying digital contents can be repeated endlessly only by skipping detection of the copying inhibition bit.

Further, a DAT recording apparatus produced immediately after popularization of DAT started do not have the coping inhibition function, and it is possible to repeat operations of copying digital contents with the old type of recording apparatus by using a recording medium in which the digital contents was recorded once.

In the case of ID code authorization method described as the second example above, as it is necessary to acquire ID code independently from a CD-ROM when the application program is installed. Effect of inhibition of illegal operation for copying digital contents is expected, but actually there is a problem that the ID code is often distributed with an illegally copied CD-ROM. Especially, after the application program is installed, the ID code is not required except the case where user support is provided from a provider of the application program. Namely, with this ID code authorization method, it is impossible to completely inhibit the operation for copying digital contents recorded in a CD-ROM legally obtained.

With the password authorization method used for shareware, like in the case of ID code described above, it is impossible to completely inhibit the operations for copying digital contents once legally obtained by using the password.

In the case of game machine described above, there is the problem that there are distributed copying-protection canceling devices which can replay, like the regular CD-ROM for game machine, a CD-R prepared by copying digital contents which is originally prepared as copying-allowable and recorded in a CD-ROM, namely by copying only the contents from a CD-ROM dedicated to a game machine (a portion excluding the ID code recorded in the pregap section). This copying-protection canceling apparatus cancels the copying protection by skipping the step of authorization of ID code recorded in the pregap section and forcefully sending a signal indicating that the CD-ROM is a legal one to a CPU of the game machine, and resultantly this scheme allows the operation for illegally copying digital contents recorded in a CD-ROM for game machine.

The ciphering technology described as the third example above can be for insuring security of data in a document file, for enabling the secret talk function in digital telephone, for accounting for chargeable broadcasting, and further for scrambling digitized musical data or video data, but when a great volume of data is to be ciphered, a long time is required for encoding and decoding, and this technology is not suited to huge data or a big program.

The electronic watermark technology described as the fourth example above enables identification of a source of illegal copies and detection of falsified data, but the technology allows endless repetition of the operation for copying digital contents, and further also the copied contents can be reproduced or visually checked, which means that the illegal operation for copying digital contents is substantially allowed.

SUMMARY OF THE INVENTION

It is an object of the present invention to provide a digital contents copying-inhibition method which can physically inhibit illegal operation of copying digital contents such as music pieces or programs and also which can effectively limits use of digital contents once copied by a method different from conventional technologies such as the ID code authorization technology or ciphering technology, and also to provide a computer-readable recording medium in which a program for making a computer execute the program is recorded.

The digital contents copying-inhibition apparatus according to the present invention comprises a guard data storage section in which guard data to be appended to a digital data such as sound and image and sensed only in reproduction after the digital data is compressed is stored, a data analysis section which identifies a position of a digital value having a prespecified increase data and also a prespecified amplitude in digital data as a peak position, sets a flag for a digital value at a position by a prespecified number away from the peak position, and sets a plurality of digital values extending over a range centering on the digital value position for which the flat is set as a data pattern, and a guard data appending section which modifies the digital data by appending the guard data to the position where the data pattern is present.

Other objects and features of this invention will become apparent from the following description with reference to the accompanying drawings.

BRIEF DESCRIPTION OF THE DRAWINGS

FIG. 2 is a flow chart showing the processing executed by the digital contents copying-inhibition apparatus according to the first embodiment;

FIG. 3 is a flow chart showing the digital audio data average value computing processing in the digital contents copying-inhibition apparatus according to the first embodiment;

FIG. 4 is a flow chart showing the peak detection and guard data appending position identification processing in the digital contents copying-inhibition apparatus according to the first embodiment;

FIG. 6 is a flow chart showing the guard data appending processing in the digital contents copying-inhibition apparatus according to the first embodiment;

DESCRIPTION OF THE PREFERRED EMBODIMENTS

Preferable embodiments of the digital contents copying-inhibition apparatus and digital contents copying-inhibition method according to the present invention are described in detail below with reference to the related drawings. The present invention is not limited to these embodiments.

At first the digital contents copying-inhibition apparatus and digital contents copying-inhibition method according to a first embodiment of the present invention will be explained below. In the digital contents copying-inhibition apparatus and digital contents copying-inhibition method according to the first embodiment, when audio data digitally recorded in a music CD or in MD is fetched into a computer and compressed into a file having, for instance, the MP3 (MPEG audio layer 3) format or recorded in an MD, digital audio data enabling inhibition of copying is newly prepared by appending guard data to the original audio data so that distortion is generated in the original musical data.

Figure 1:
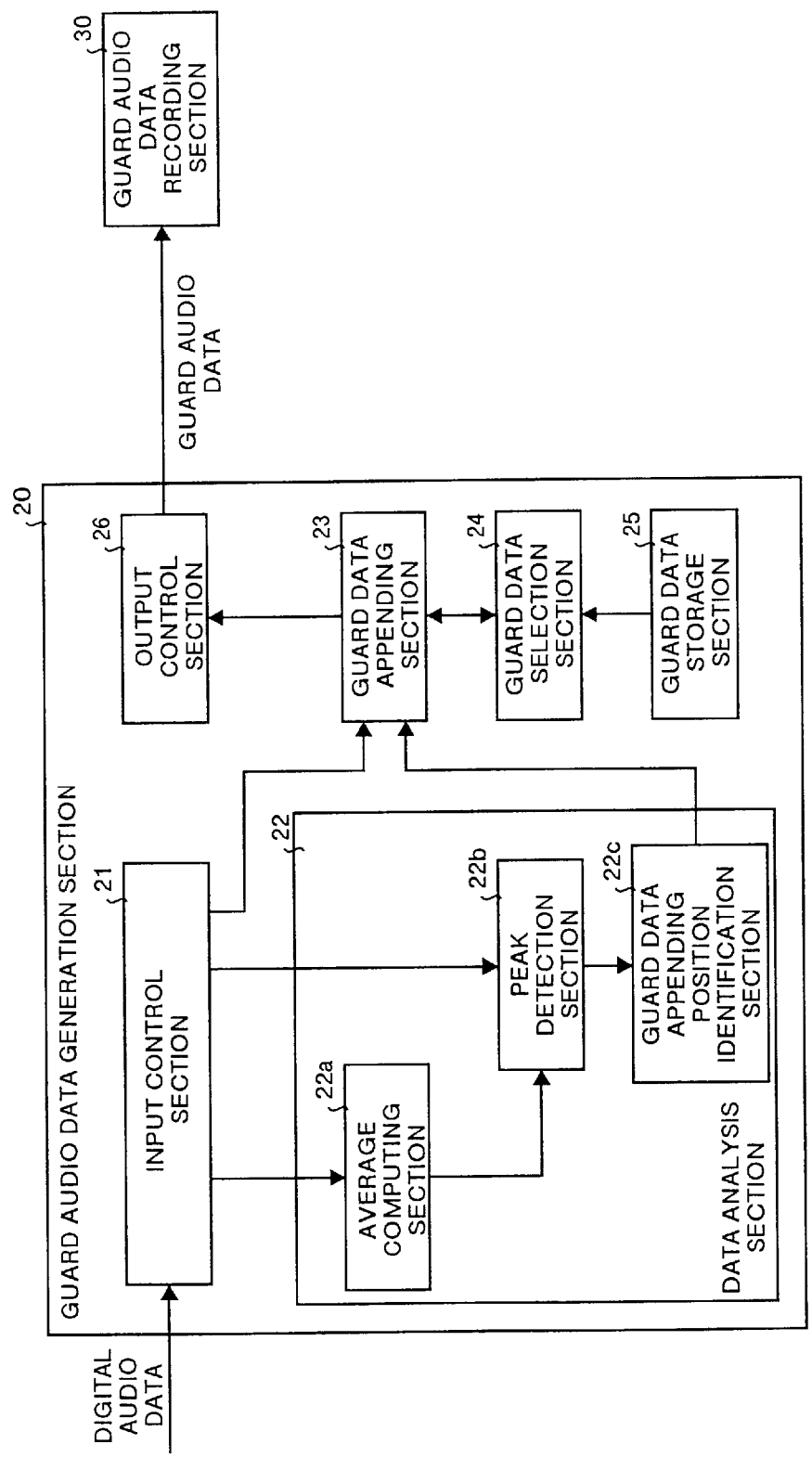
FIG. 1 is a block diagram showing general configuration of a digital contents copying-inhibition apparatus according to a first embodiment of the present invention.

FIG. 1 is a block diagram showing general configuration of the digital contents copying-inhibition apparatus according to the first embodiment. The digital contents copying-inhibition apparatus 10 is an apparatus which appends guard data for preventing digital contents from being copied to the original audio data such as music pieces to prepare new digital audio data. The apparatus 10 comprises a guard audio data generation section 20 which prepares digital audio data with guard data appended thereto, and a guard audio data recording section 30 which writes the guard audio data generated by the guard audio data generation section 20 in a new recording medium such as a CD-R.

The guard audio data generation section 20 comprises an input control section 21 which receives digital audio data to be guarded, a data analysis section 22 which analyzes the digital audio data input into the input control section 21, a guard data storage section 25 in which a group of guard data to be appended to digital audio data is stored, a guard data selection section 24 which selects specified guard data in the group of guard data stored in the guard data storage section 25, a guard data appending section 23 which appends the guard data selected by the guard data selection section 24 to a specified position in the digital audio data, and an output control section 26 which outputs digital audio data with guard data appended thereto.

The data analysis section 22 comprises an average computing section 22a which computes average of sound volume in digital audio data for one movement output by the input control section 21 (described as total digital audio data hereinafter), a peak detection section 22b which detects digital audio data with sound volume higher than an average value of sound volume computed by the average computing section 22a and also with a peak value in a change rate of sound volume higher than a prespecified value, and a guard data appending position identification section 22c which sets conditions for identifying a position where guard data is to be appended based on the peak position detected by the peak detection section 22b. A data indicating the conditions for appending guard data set by the guard data appending position identification section 22c is output to the guard data appending section 23.

The guard data storage section 25 comprises a storage device such as a hard disk or an optical disk, and a group of guard data described later is previously stored therein.

Operations of the digital contents copying-inhibition apparatus 10 are described below centering on the guard audio data generation section 20. At first, contents of the processing required when appending guard data to original audio data in this digital contents copying-inhibition apparatus 10 will be explained.

As described above, distortion caused by appending of guard data is generated when digital audio data is converted for compression, but after guard data is appended to original digital audio data, if the section where the guard data is appended is reproduced and sounds unpleasant before conversion for compression, the value as musical contents is lost even though copying of the digital contents can be prevented.

Thus, it is necessary to carefully select a position at which guard data is appended. In the digital contents copying-inhibition apparatus 10 according to the first embodiment, the processing for appending the guard data is executed based on a result of psychological auditory sense assay which is utilized also in the compression processing for MP3 or MP. The psychological auditory sense assay is a method of identifying a portion of digital audio data not audible to human, and what sounds are not audible is determined by making use of the minimum audibility limit for human and the masking effect.

The minimum audibility limit is a range decided by a lower limit of sound volume audible to human in the silent situation and by the characteristic of human auditory sense that is not sensitive to a change of sound volume in a high frequency range. In other words, because of the minimum audibility limit, a portion of digital audio data having a small sound volume and a high frequency is not valuable as musical information.

The masking effect indicates the phenomenon that, when a large sound is being generated, a smaller sound is not audible to the human auditory sense, and that, especially when frequency of the larger sound is close to that of the smaller sound, it is extremely difficult to hear the smaller sound.

Therefore, because of the minimum audibility limit and masking effect, it is preferable to express the guard data themselves as digital audio data with a small volume change rate and a high frequency and also to append guard data to a section with a small sound volume immediately behind a portion with a large sound volume.

To satisfy this requirement, it is necessary at first to identify a portion (peak) having a large sound volume with a prespecified change rate and also to identify a portion with a small sound volume immediately behind the identified peak. This processing is equivalent to the peak detection and guard data appending position identification processing explained later. When identifying the peak, it is necessary to set a reference value to determine whether the sound volume is larger than the reference value or not. It is preferable to use an average value of a sound volume of digital audio data for a movement, and therefore it is necessary to calculate the average value. This processing is equivalent to the processing of calculation of average value described explained later.

FIG. 2 is a flow chart showing the processing executed in the digital contents copying-inhibition apparatus according to the first embodiment. As shown in FIG. 2, the guard audio data generation section 20 in the digital contents copying-inhibition apparatus 10 executes following processing to the digital audio data to which guard data is to be appended. That is, calculating an average value of the digital audio data (step S201), detecting of peak and identification of guard data appending position (step S202), and appending of the guard data (step S203).

The term "digital audio data" indicates digital data obtained by sampling and quantizing analog musical signals for original sounds through the PCM (Pulse-Code Modulation) system. Especially, the case where digital conversion through the PCM system is executed based on the sampling frequency of 44.1 kHz and quantization number of 16 bit which are standard digital specifications for the music CD is described below. In the following description, it is assumed for easier understanding of operations that the guard audio data generation section 20 processes the digital audio data as 16-bit numerical values serially input therein, and the term "sampling data" used in the following description indicates the 16-bit numerical values.

The digital audio data average value calculation processing (step S201) is the processing of calculation an average value of all the digital audio data, namely an average value of a sound volume in one movement. FIG. 3 is a flow chart showing the digital audio data average value calculation processing. At first, the input control section 21 inputs the sampling data successively into the average value computing section 22a in the data analysis section 22. The average value computing section 22a successively adds the input sampling data, and counts the number of input sampling data (step S301). After all of the digital audio data has been input, the average value computing section 22a calculates the average of the digital audio data by dividing the result of addition above by the result of counting (step S302).

The peak detection and guard data appending position identification processing (step S202) is the processing for detecting a peak satisfying the prespecified conditions from the digital waveform when the total digital audio data is expressed with a digital waveform, fetching sampling data at a position shifted by a prespecified number from the sampling data corresponding to the detected peak, and setting the sampling data further extending by the prespecified number from the fetched sampling data as appending conditions for the guard data (the data pattern described below).

Figure 5:
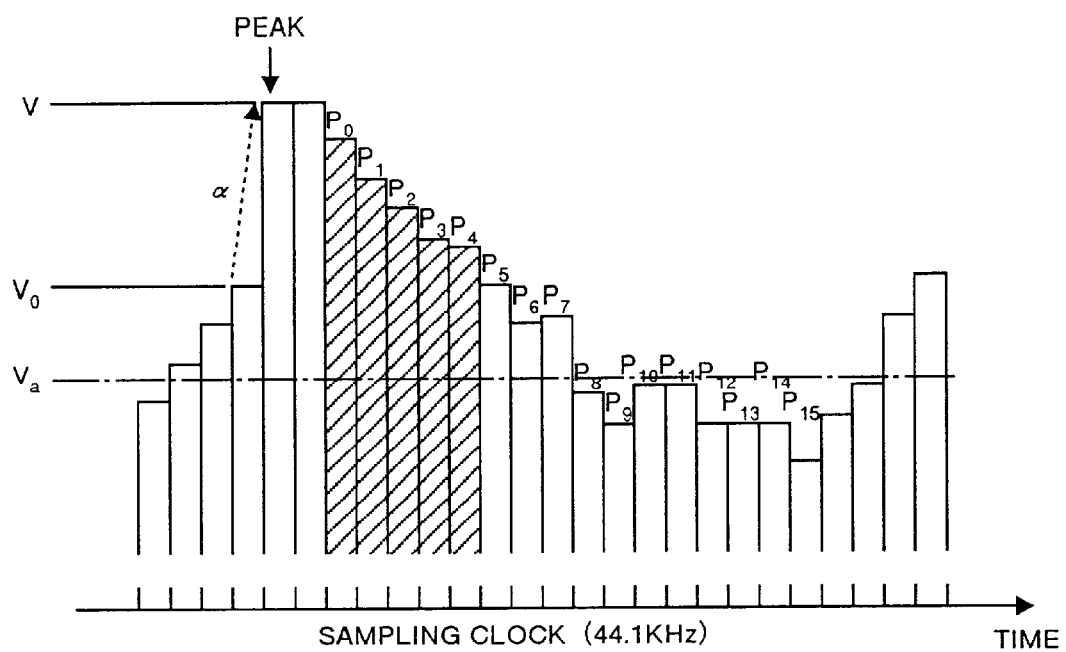
FIG. 5 shows digital audio data processed in the peak detection and guard data appending position identification processing executed by the digital contents copying-inhibition apparatus according to the first embodiment.

FIG. 4 is a flow chart showing the peak detection and guard data appending position identification processing. FIG. 5 shows digital audio data which is processed in this peak detection and guard data appending position identification processing. At first, to detect a peak from digital audio data, the input control section 21 successively inputs sampling data to the peak detection section 22b in the data analysis section 22 (step S401). The peak detection section 22b determines whether the value of input sampling data is greater than the average value (indicated by the sign $V_a$ in FIG. 5) or not (step S402).

When it is determined that the sampling data is equal to or smaller than the average value, the input control section 21 inputs the next sampling data. When it is determined that the value of the sampling data is greater than the average value, whether the value of the sampling data is greater by a prespecified change rate than the value of the sampling data just ahead or not is determined (step S403).

When it is determined that the value of the sampling data is not greater by a prespecified change rate than the value of the sampling data just ahead, the input control section 21 inputs the next sampling data. When it is determined that the value of the sampling data is greater by a prespecified change rate than the value of the sampling data just ahead, the value of the sampling data is recognized as the peak described above. In FIG. 5, sampling data which is larger by a change rate $\alpha$, which is equal to or more than the prespecified change rate (for instance, 30%), than the sampling data having the value $V_o$ which is equal to or more than the average value $V_a$ is recognized as the peak.

When a peak is detected, the peak detection section 22b outputs a signal indicating that the sampling data currently being input is located at the peak to the guard data appending position identification section 22c. When such a signal is input, the guard data appending position identification section 22c starts the guard data appending position identification processing (step S404). In the guard data appending position identification processing, sampling data is inputted prespecified times (twice in FIG. 5) from the sampling data corresponding to the peak described above, and a flag is set for the sampling data inputted last ($P_o$ in FIG. 5).

Further, sampling data is successively inputted prespecified times (5 times in FIG. 5) from the sampling data in which the flag is present, and values of the sampling data prespecified times are successively recorded. Finally, the sampling data inputted prespecified times and stored is set as a particular pattern which functions as conditions for identifying a position where guard data is appended. In FIG. 5, the pattern consisting of data $P_0$, $P_1$, $P_2$, $P_3$, $P_4$, $P_5$ corresponds to the data pattern.

This data pattern plays a role of retrieval key for identifying a position at which guard data is to be appended in all the digital audio data. In other words, guard data is appended to the position where the data pattern is present in all the digital audio data.

When the data pattern is decided, then the guard data appending processing (step S203) is executed. The guard data appending processing is the processing of appending the guard data to the position of data pattern in all the digital audio data. Description of the guard data appending processing below assumes that the data pattern consists of five pieces of sampling data as shown in FIG. 5.

FIG. 6 is a flow chart showing the guard data appending processing. At first, when the data pattern is decided by the guard data appending position identification section 22c, the guard data appending section 23 inputs the data pattern, and further successively inputs sampling data from the head of the total digital audio data via the input control section 21 (step S601).

It is assumed herein that the 5 pieces of sampling data serially inputted are stored, for instance, in a storage section such as a serial/parallel conversion circuit having 5 D latches. Namely, the 5 pieces of sampling data stored in the storage section can be compared to a data pattern consisting of 5 pieces of sampling data, and whether the two data patterns are identical to each other or not is determined (step S602) Namely, a data pattern is detected from sampling data.

When it is determined that a data pattern consisting of inputted 5 pieces of sampling data is not identical to the data pattern, next sampling data is inputted, and contents stored in the storage section is shifted by one piece of data. When it is determined that the data pattern consisting of inputted 5 pieces of sampling data is identical to the data pattern, selection of guard data is executed by the guard data selection section 24 (step S603).

Figure 7A:
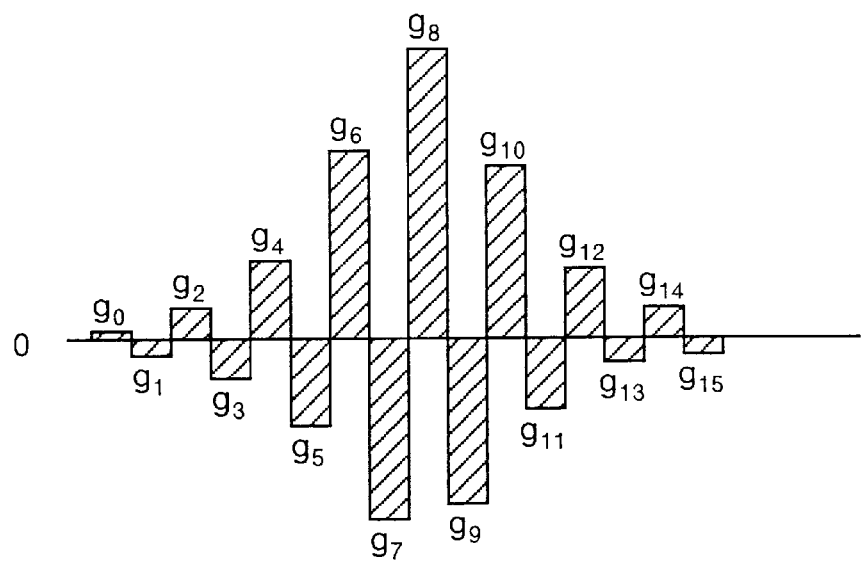
FIG. 7A and FIG. 7B are examples of guard data in the digital contents copying-inhibition apparatus according to the first embodiment.
Figure 7B:
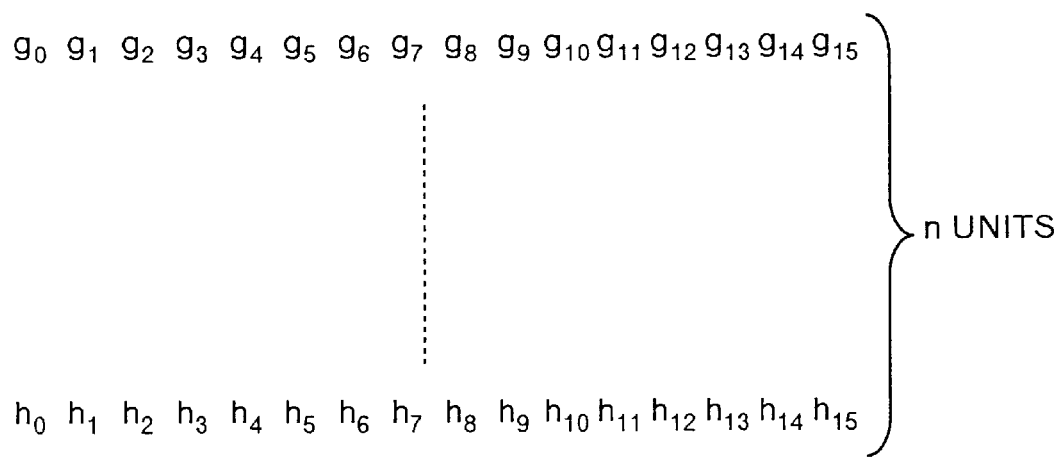

The guard data selection section 24 selects appropriate guard data from the group of guard data stored in the guard data storage section 25 according to the order at which the maximum value in the total digital audio data or a data pattern was detected. FIGS. 7A and 7B show the examples of guard data. As shown in FIGS. 7A and 7B, a number of data pieces constituting guard data is not required to be identical to that of data pieces constituting the data pattern. In other words, appending of guard data does not mean replacement with only a data pattern, and data pattern is used only to identify a position for starting appending of guard data.

Especially, the guard data shown in FIG. 7A comprises 16 pieces of data $g_0$ to $g_{15}$ having an alternatively different signs respectively as one unit, and is required based on the concept of the minimum audibility limit described above to be expressed as a sufficiently small change in sound volume. Further, the guard data should have the specific frequency characteristics that the frequency components appears only when subband disassembly is executed in the compression processing described hereinafter to guard audio data with the guard data append thereto.

Further, as shown in FIG. 7B, the guard data group stored in the guard data storage section 25 does not always consist of the same guard data, and may consist of, for instance, n units of guard data each having different contents respectively. The reason for employment of this type of configuration is also referred to in description of the compression processing below, and with a group of guard data having the same contents, a CPU which executes the compression processing determines that an abnormal signal is repetitively included in the digital audio data, and may skip analysis of the signal in the guard data section.

When guard data is selected by the guard data selection section 24, the guard data appending position identification section 22c successively appends the selected guard data to sampling data starting from those present at the head of data pattern described above (step S604). For instance, 16 pieces of data $g_0$ to $g_{16}$ constituting the guard data are successively appended to sampling data $P_0$ to $P_{15}$ including $P_0$ to $P_4$ at its head as shown in FIG. 16. With this operation, the sampling data $P_0$ to $P_{15}$ are modified, but the modification does not cause any particular problem when the sampling data is regenerated.

When one data pattern is detected and appending of guard data to the data pattern is finished, whether input of all the digital audio data has been completed or not is determined (step S605), and when it is determined that the input has not been completed, the next sampling data is inputted, and detection of a data pattern is repeated. When it is determined that input of total digital audio data is over, the guard data appending processing is terminated.

The appending of guard data may not always be executed to all portions each including a data pattern in the digital audio data, and for instance the guard data may be appended once each time a prespecified number of data patterns is detected.

The digital audio data with guard data appended thereto as described above is output as guard audio data via the output control section 26, and is inputted in a guard audio data recording section 30 in the next stage. When the guard audio data recording section 30 receives the guarded audio data, the guard audio data recording section 30 prepares digital audio data with the guard data append thereto, namely musical contents having the copying-inhibition function by writing the guard audio data in a recording medium such as a CD-R.

The digital contents copying-inhibition apparatus 10 according to the first embodiment operates as described above, and copying by means of compression and reproduction of digital audio data prepared by this digital contents copying-inhibition apparatus 10 are described below.

Generally, musical contents require a large memory capacity in a recording medium when the data size recorded in a music CD is kept unchanged, and is not suited for treatment. Further, when the musical contents is processed on a personal computer or distributed through a network, a large memory space for recording is required and a long time is required for down-loading, which is disadvantageous.

To solve the problems as described above, digital musical data is generally treated in the compressed form. For instance, when digital musical data is stored into MD or as MP3 file, the data is compressed to one fifth to one tenth of the original size. In other words, when digital musical data recorded in a music CD is copied, the data is in most cases compressed as described above.

When the compression processing is executed to store digital musical data in MD or MP3 file, frequency analysis is executed by decomposing the original digital musical data into frequency components, and data corresponding to frequency components each determined as unnecessary is deleted based on the psychological auditory sense assay. In this frequency analysis, generally so-called the subband decomposition in which digital musical data is decomposed to a plurality of frequency bands is executed, and each frequency band obtained by subjecting the original digital musical data to subband decomposition is decomposed to data having a further smaller frequency unit by means of DCT (discrete cosine conversion).

Whether data for each decomposed frequency unit should be deleted or not is then determined, and data compression is executed by synthesizing data for frequency components which are determined as not to be deleted. Number of data to be synthesized, namely number of filters simultaneously effected among those allowing passage of data is restricted to keep the effect of compression at a level higher than a prespecified one, and also because of deviation of frequency components included in the audio data.

As the guard data allows passage of data through a filter and in addition allows output of data from a number of filters equal to or more than the specified restricted number, so that a result of synthesis of output data is not correct. In other words, the result of synthesis generates distortion of voice and sound, so that the digital musical data is compressed in the disturbed state.

Therefore, when the data compressed as described above is decomposed and regenerated, the distortion is also regenerated, and resultantly extremely unpleasant voice and sound are provided to audience. This means that the guarded musical data is not copied correctly, which provides the copy-inhibition effect.

As described above, with the digital contents copying-inhibition apparatus 10 according to the first embodiment of the present invention, the copying-inhibition effect is realized by appending guard data to digital audio data, and this technology can be applied not only to digital video data, but also to a digital image file.

Image data constituting a digital image file can be expressed as a collection of special frequency components based on two- or higher dimensional changes in the brightness or color information, and is often treated as a compressed file of JPEG (Joint Photographic Experts Group). In the image compression process as described above, frequency decomposition is executed like in the digital audio data compression processing described above, so that the effect by appending of guard data is provided.

The digital contents copying-inhibition apparatus and digital contents copying-inhibition method according to a second embodiment of the present invention are described below. The digital contents copying-inhibition apparatus and digital contents copying-inhibition method according to the second embodiment are characterized in that distortion emphasizing data is appended to a section different from that in which guard data is appended to emphasize distortion generated in compression processing to the digital audio data with guard data appended according to the first embodiment.

The digital contents copying-inhibition apparatus according to the second embodiment has, in addition to the configuration of digital contents copying-inhibition apparatus shown in FIG. 1, an emphasizing appending section which appends the distortion emphasizing data to digital musical data. Other components of the configuration are the same as those shown in FIG. 1, so that description thereof is omitted herefrom.

Figure 8:
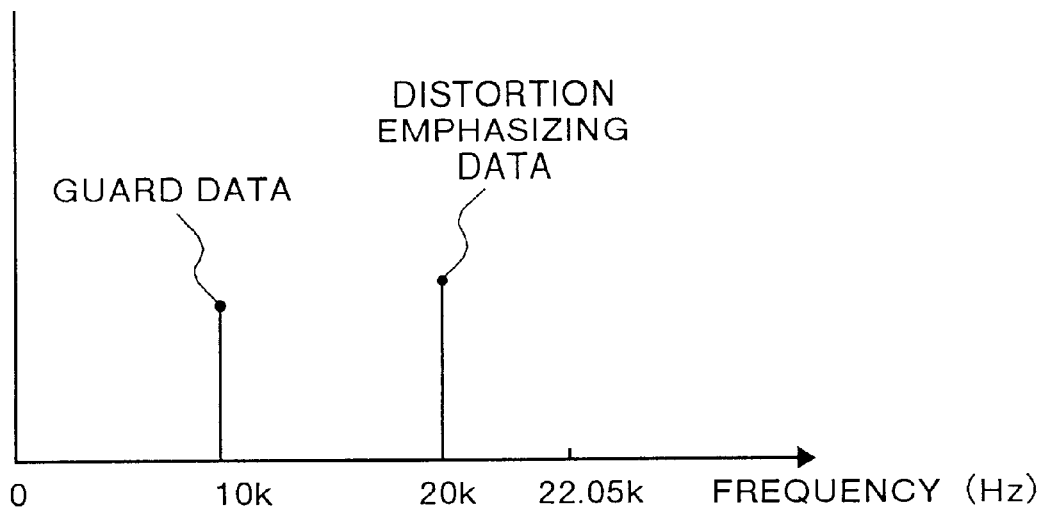
FIG. 8 shows operations of the emphasizing data appending processing in a digital contents copying-inhibition apparatus according to a second embodiment of the present invention.

FIG. 8 shows operations of the emphasizing data appending section in the digital contents copying-inhibition apparatus according to the second embodiment. At first, as the preposition, the sampling frequency is set to 44.1 kHz in a music CD, because an audible range to human is 20 kHz or below, and to evade the problem of aliasing generated based on the sampling principle.

Theoretically digital audio data having a frequency component of up to 22.05 kHz can be recorded as effective information on a music CD. As described, however, digital audio data having a frequency component in a range from 20 kHz to 22.05 kHz can not be sensed by human auditory sense even if the data is regenerated, so that ordinarily data in this range is worthless. In addition, it is known based on the general wave theory that, in association with a signal having a frequency component, a signal having a frequency component obtained by multiplying or dividing the original frequency component by an integral number is generated.

As shown in FIG. 8, at first, data functioning as a frequency component in an inaudible range (for instance, 20 kHz) is appended as distortion emphasizing data to digital audio data. The portion described in the first embodiment in which guard data is to be appended is appended to a data area including a frequency component (for instance, 10 kHz) which is half of the frequency component of the distortion emphasizing data.

With this operation, in addition to the distortion generated by the effect in the first embodiment, distortion due to presence of the distortion emphasizing data is loaded to the data portion to which the guard data is appended, and when the data is decompressed and reproduced, the distortion becomes more remarkable.

Figure 9:
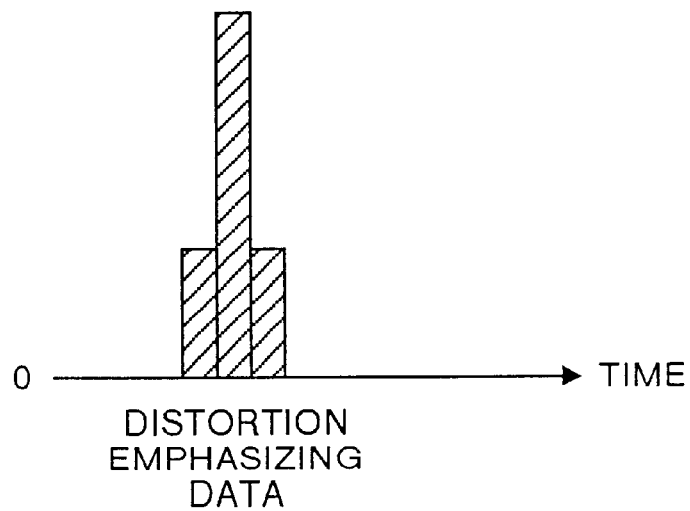
FIG. 9 shows one example of distortion emphasizing data in the digital contents copying-inhibition apparatus according to the second embodiment.

In the case of distortion emphasizing data, as a value corresponding to the sound volume is larger, the effect of distortion emphasis described above becomes larger. When the value is too large, however, namely in a case where a frequency component of 20 kHz extremely close to the audibility limit is appended as the distortion emphasizing data, the presence may be sensed. So the distortion emphasizing data should preferably be composed of a combination of only plus-sided data as shown in FIG. 9 as data not having the characteristics of voices.

As described above, with the digital contents copying-inhibition apparatus according to the second embodiment, the guard data described in the first embodiment is appended to a data area in which a specific frequency components appears frequently in digital audio data. Further, distortion emphasizing data having a frequency two times higher than the specific frequency component and at the same time in an inaudible range to prepared digital audio data, so that, after the digital audio data is once copied and then reproduced, distortion in the portion including the guard data is reproduced in the emphasized state, and the effect more effective as compared to the copying-inhibition effect described in the first embodiment can be expected.

A digital contents copying-inhibition apparatus and a digital contents copying-inhibition method according to a third embodiment of the present invention are described below. With the digital contents copying-inhibition apparatus and digital contents copying-inhibition method according to the first or second embodiment, the copying-inhibition effect can be expected in compression of digital audio data or a digital image file, but with the digital contents copying-inhibition apparatus and digital contents copying-inhibition method according to the third embodiment, the copying-inhibition effect can be expected not only in compression of digital audio data and a digital image file, but also in compression of all types of digital contents including document data or a program.

In the digital contents copying-inhibition apparatus and digital contents copying-inhibition method according to the third embodiment, to realize the copying-inhibition effect, encoding is executed to digital data by specifying conditions for encoding and encoding code. The digital data encoded as described above can be reproduced to the original digital data only when decoding is executed by using the decoding data generated in the encoding operation described above as well as the conditions for encoding and encoding code.

Further, the digital contents copying-inhibition apparatus and digital contents copying-inhibition method according to the third embodiment are different from the conventional type of ciphering technology in the point that the algorithm for encoding described above is selected according to the type of the digital data such as a audio data, video data, or a program.

Figure 10:
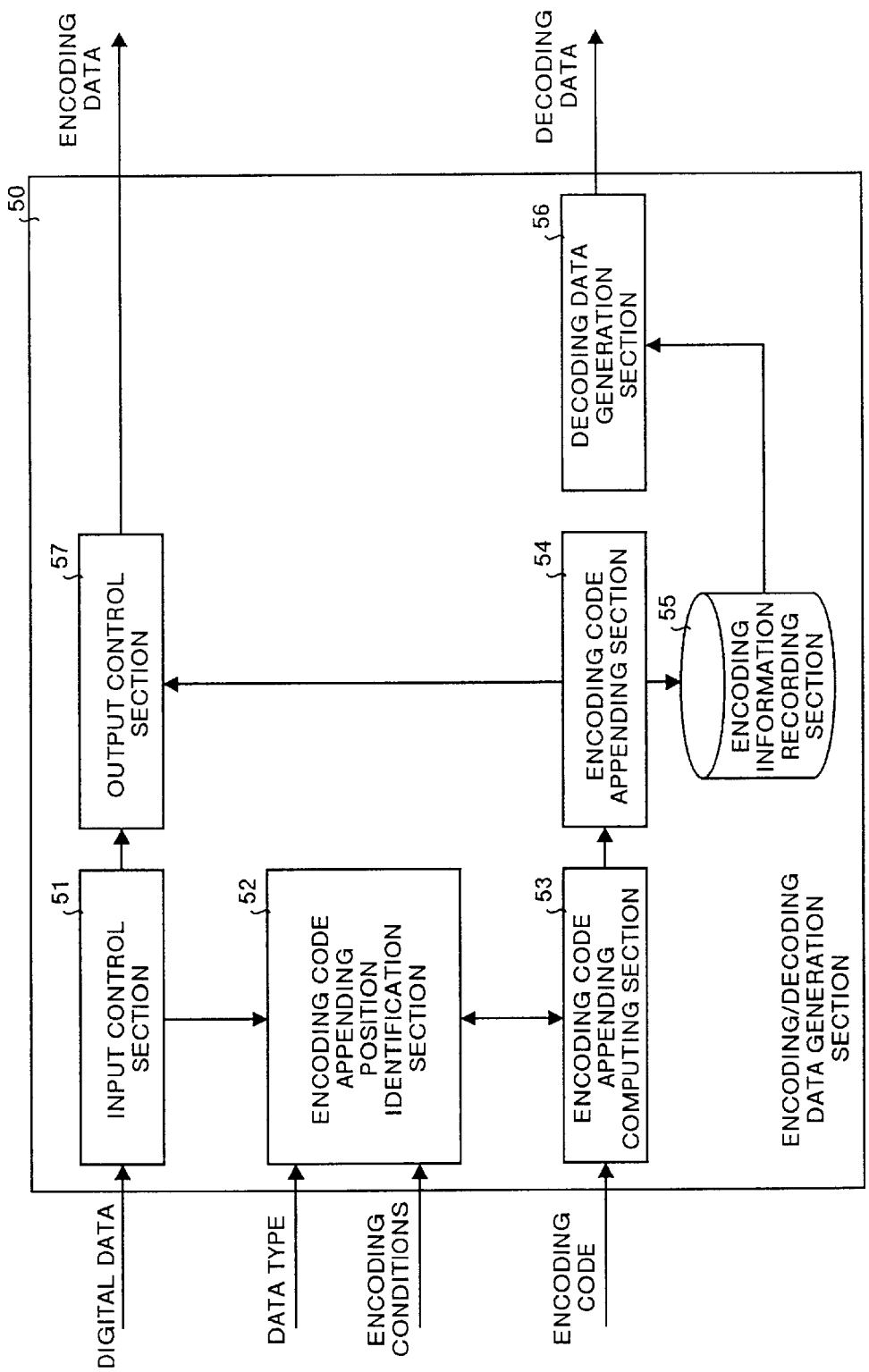
FIG. 10 is a block diagram showing general configuration of a portion of a digital contents copying-inhibition apparatus according to a third embodiment of the present invention.

FIG. 10 is a block diagram showing general configuration of a portion of the digital contents copying-inhibition apparatus according to the third embodiment. As shown in FIG. 10, the digital contents copying-inhibition apparatus has an encoding/decoding data generation section 50.

The encoding/decoding data generation section 50 comprises an input control section 51 which receives digital data to be encoded, an encoding code appending position identification section 52 which receives a data type specifying a type of digital data and also which identifies a position at which the encoding code is to be appended in the digital data inputted into the input control section 51, an encoding code appending computing section 53 which receives encoding code and appends the encoding code to the position identified by the encoding code appending position identification section 52, an encoding code appending section 54 which actually appends the encoding code to the digital data based on a result of computing by the encoding code appending computing section 53, an encoding information recording section 55 which records contents of the processing by the encoding code appending section 54 as encoding information, a decoding data generation section 56 which generates decoding data based on the encoding information recorded in the encoding information recording section 55, and an output control section 57 which outputs the encoded digital data as encoded data.

Figure 11:
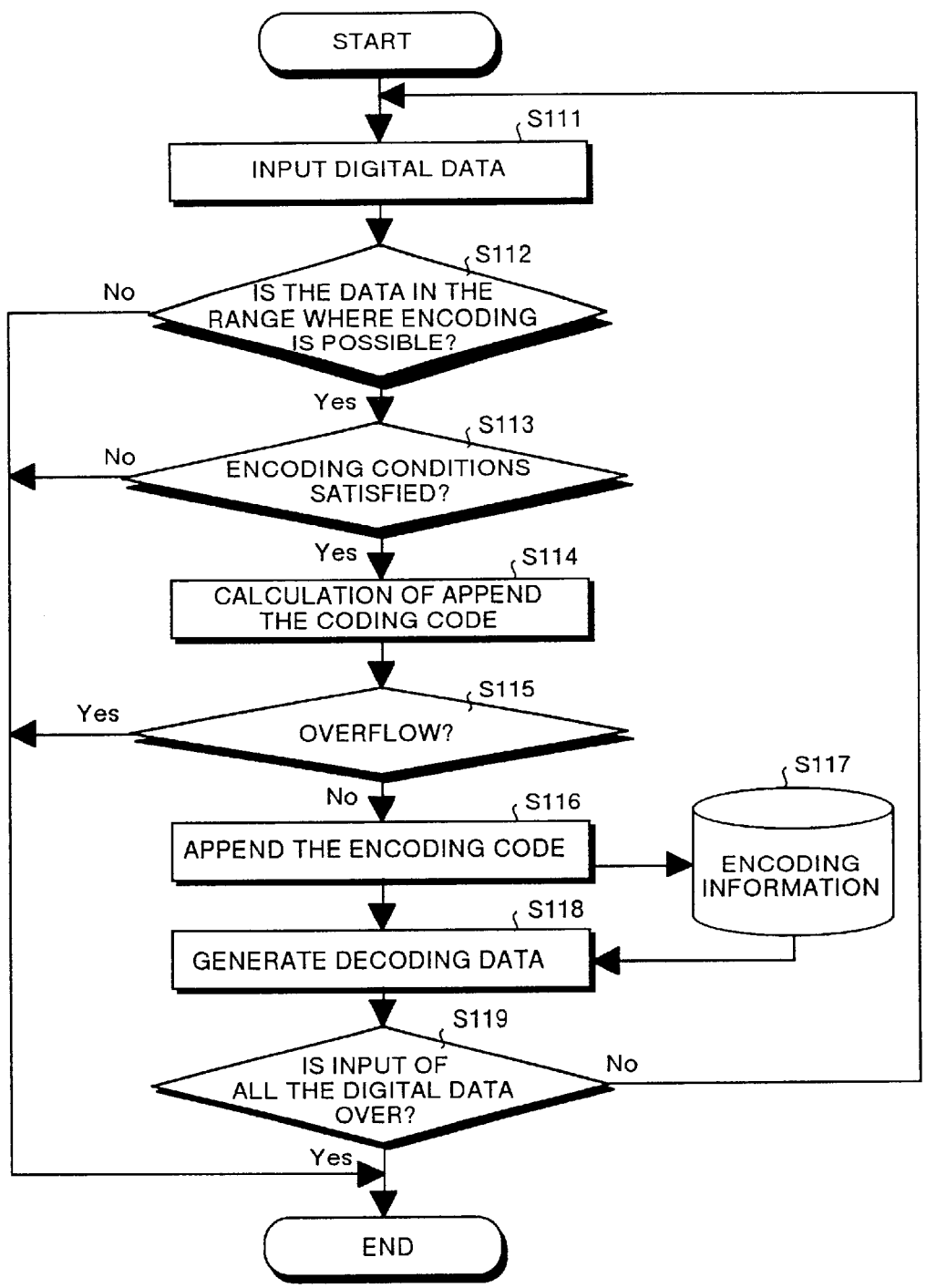
FIG. 11 is a flow chart showing the processing executed by the digital contents copying-inhibition apparatus according to the third embodiment.

The encoding/decoding data generation section 50 is described below with reference to operations of the digital contents copying-inhibition apparatus according to the third embodiment. FIG. 11 is a flow chart showing the processing executed in the digital contents copying-inhibition apparatus according to the third embodiment. The encoding/decoding data generation section 50 inputs a data type of digital data to be encoded and conditions for encoding to the encoding code appending position identification section 52, and also inputs encoding code to the encoding code appending computing section 53.

The data type indicates a type of digital data to be encoded, and is code allocates to each different type of data such as audio data, video data, document data, or a program.

The encoding condition is code indicating what conditions should be satisfied by a portion of digital data to be encoded to which encoding code is appended, and the encoding code is a value indicating a numeral value to be appended. For instance, when a data type indicates document data and the document data is treated as an array of numerical values expressed with hexagonal numbers, an arbitrary hexagonal number is specified as the encoding condition and encoding code.

When the data type, encoding condition, and encoding code are specified, the encoding/decoding data generation section 50 inputs digital data to be encoded to the input control section 51 (step S111). When the input control section 51 receives the digital data, the input control section 51 transfers the digital data to the encoding code appending position identification section 52.

The encoding code appending position identification section 52 decides an encoding algorithm to identify an encoding code appending method and an encoding code appending position according to the data type, and identifies a data position satisfying the encoding condition for the digital data inputted through the input control section 51.

The encoding algorithm specifies a retrieval range of code indicating the encoding condition, and decides how the encoding code is to be appended. For instance, in a case of document data, the retrieval range is contents as a whole, and a numerical value indicated by the encoding code is simply appended to data present at a position shifted by a prespecified number of data from the data identified through the retrieval.

Especially, the encoding algorithm controls the retrieval range to a range of digital data obtained by excluding a portion to which the system (OS) directly relates or a portion which is related to an address, and converts a value of the eighth bit of data identified through the retrieval. In this case, the encoding code is not used, but the program is basically expressed as an array of 8-bit code, and for instance, when encoding code is simply appended to digital data and the digital data is changed to a command or the like, which a computer can recognize, by only being converted to other alphabets or figures in the boot area, the program may be started.

On the other hand, in a program, as only 7 bits of 8 bits are used to express an alphabet or a numerical value constituting a command or the like in the source, when the eighth bit which is a top bit is set to "1", the code can not be recognized by a computer.

As described above, digital data is inputted via the input control section 51 in the state where a specific encoding algorithm is selected, the encoding code appending position identification section 52 determines whether the digital data is in a range in which the encoding indicated by the algorithm can be executed or not (step S112).

When the inputted digital data is not in a range in which encoding can not be executed, whether all of the digital data has been inputted or not is determined (step S119), and when it is determined that input of all digital data has not been finished yet, the processing in step S111 is executed, and the next digital data is inputted.

When it is determined that the digital data inputted in step S112 is in the range in which encoding is possible, then whether the digital data matches the code indicating the encoding condition or not is determined (step S113). When the digital data does not match the code, the processing in step S119 is executed, and when it is determined that the digital data matches the code indicating the encoding condition, the digital data itself or digital data after a prespecified number of digital data pieces is inputted is decided as data to which the encoding code is to be appended.

The encoding code appending position identification section 52 transfers the data to which the encoding code is to be appended, and a signal indicating the encoding code appending method following the encoding algorithm to the encoding code appending computing section 53.

When the encoding code appending computing section 53 receives the digital data to which the encoding code is to be appended, the encoding code appending computing section 53 appends the encoding code to the data, like in the case described above, following the encoding code appending method indicated by the signal indicating the encoding code appending method (step S114).

When the result of appending in step S114 is over the bit number defined in the digital data, the data to which the encoding code is to be appended is excluded as a potion which does not change the digital data actually (YES in step S115), and then the processing in step S119 is executed. When the result is not over the specified bit number, the encoding code appending computing section 53 transfers the result of appending to the encoding code appending section 54.

When the result of appending described above is received, the encoding code appending section 54 replaces digital data including the data to which the encoding code is to be appended with the result of appending, and records encoding code processing information concerning the appending computing method, a position of the data to which the encoding code is to be appended or the like in the encoding information recording section 55 (step S117).

Further, the encoding code appending section 54 generates decoding data required when decoding the encoded digital data (encoded data) based on the encoding code appending processing information (step S118). The data portion which is encoded in the encoding code appending section 54 is outputted to the output control section 57, and the output control section 57 replaces data corresponding to the data to which the encoding code is to be appended in the digital data input via the input control section 51 and not encoded yet at a prespecified timing with the encoded data portion.

After replacement of this data portion, the processing in step S119 is executed, and the above-described sequence of operations is repeated until input of all digital data is over. Namely, with this operation, the output control section 57 can successively output encoded digital data.

As described above, with the digital contents copying-inhibition apparatus according to the third embodiment, when encoding conditions, encoding code, and a type of digital data are specified, the digital contents copying-inhibition apparatus encodes the digital data according to the contents of specification, and receives the encoded data and decoding data indicating contents of encoding.

To decode the encoded data to the original digital data with a decoding unit described below (described as decoder hereinafter), the encoding condition, encoding code, and decoding data are required. When these three types of information are managed discretely, the operations becomes very complicated, but as the encoding conditions and encoding code can be expressed with relatively simple code, even when a number of encoding data is present, the management is easy.

On the other hand, the decoding data has a larger size as compared to the encoding condition and encoding code with the management more difficult, and decoding can not be executed when only the contents of decoding data is known. Therefore, the decoding data can be treated together with the encoding data as an encoding file.

Figure 12:
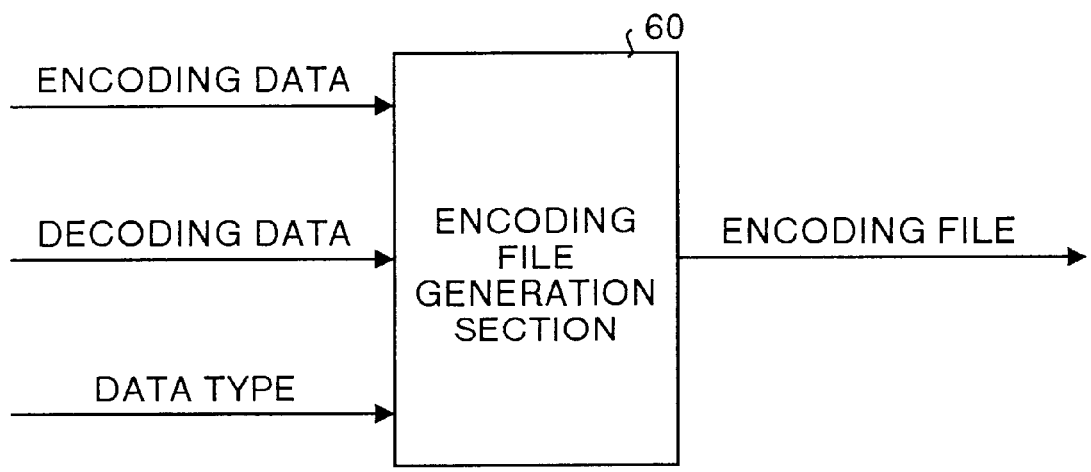
FIG. 12 is a block diagram showing general configuration of a portion of the digital contents copying-inhibition apparatus according to the third embodiment.

Thus, the digital contents copying-inhibition apparatus according to the third embodiment may have an encoding file section for generating the encoding file. FIG. 12 is a block a diagram showing general configuration of a portion of the digital contents copying-inhibition apparatus according to the third embodiment, and especially shows the encoding file generation section described above. As shown in FIG. 12, the encoding file generation section 60 receives, in addition to the encoding data and decoding data outputted from the encoding/decoding data generation section 50, code indicating the data type described above.

Namely, an encoding file generation section 60 decides mutual arrangement of encoding data and decoding data, generates an encoding file by synthesizing the data, and outputs the encoding file.

Figure 13A:
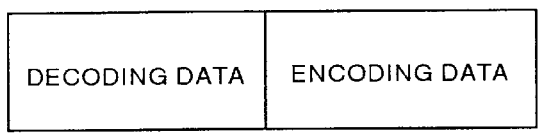
FIG. 13A to FIG. 13C show examples of structure of a encoded file generated in the digital contents copying-inhibition apparatus according to the third embodiment.
Figure 13B:
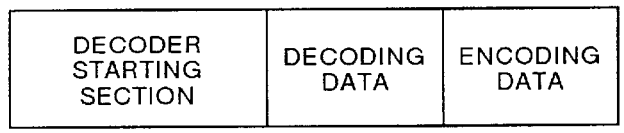
Figure 13C:
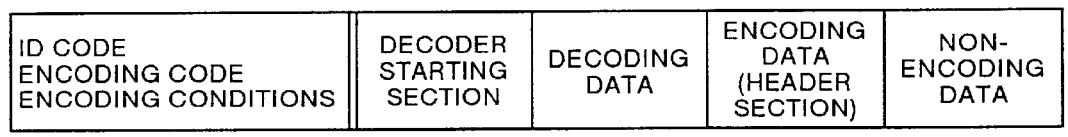

FIG. 13A to FIG. 13C show examples of configuration of the encoding file generated in the encoding file generation section 60. At first, the encode file shown in FIG. 13A shows configuration in which encoding data is appended just after the decoding data. When the decoder is operating, upon input of encoding conditions and encoding code specific to encoded data to be decoded to the decoder, at first the decoding data section is read in. The decoder reproduce the encoded data present just behind the decoding data by using the decoding data, encoding condition, and encoding code. Configuration of this encoding file is suited to data not requiring strict conditions for encoding such as document data or video data.

The encoding file shown in FIG. 13B has the configuration in which a decoder starting section is further added to the head of the configuration shown in FIG. 13A. With this configuration, even if the decoder has not been started, when an instruction or the like for visually checking contents of the encoding file is given on an operating system of the computer, the decoder can forcefully be started to request input of encoding conditions and encoding code.

The encoding file shown in FIG. 13C has the configuration suited to a case where the authorization method is specific like in a CD-ROM dedicated to game machine. As described above, in a game machine, as ID code is written in a special area (pregap), even when the encoding conditions and encoding code are written in this area, the encoding conditions and encoding code can not be read out by a CD-ROM drive used on a personal computer.

Decoding data, encoding data, and non-encoding data are appended to the decoding start section shown in FIG. 13B in an area which can be read with an ordinary CD-ROM drive. The encoding code and not-encoding code are based on the fact that, in a program like a game, restrictions can be imposed to execution thereof by subjecting only a header section expressing code for starting the program itself to encoding.

The decoder is described below. Decoding is realized by executing basically reverse operations to those described in relation to the encoding/decoding data generation section shown in FIG. 10, so that also device configuration of the decoder is the same as that shown in FIG. 10. Therefore, when correct encoding condition and encoding code are not inputted, the decoder encodes the data to be encoded according to the incorrect encoding conditions and encoding code.

This feature is employed to prevent incorrect encoding conditions and incorrect encoding code from being inputted, and in association with the fact that copying the encoding file itself is easy, the effect of copying inhibition is achieved.

The digital contents copying-inhibition apparatus and digital contents copying-inhibition method according to the third embodiment, namely the encoding/decoding system can be introduced to the field in which the conventional type of ciphering technology has been applied. Therefore, encoding file generated by this digital contents copying-inhibition apparatus insures sufficient security even when transacted as a downloaded file or an electronic mail through a network.

For instance, when particular persons can access a server on a network, by encoding a file in the server by the above-described method, a user can correctly know the contents only when the user obtains a decoder, the encoding conditions, and encoding code.

Further, the digital contents copying-inhibition apparatus and digital contents copying-inhibition method according to the third embodiment can be applied to scrambling a program provided through chargeable broadcasting such as satellite broadcasting. Precisely, the program provider encodes broadcasting signals by the digital contents copying-inhibition method, while a user can enjoy only desired programs by obtaining a decoder and also acquiring the encoding condition and encoding code through a legal route by means of, for instance, paying a fee.

The digital contents copying-inhibition apparatus according to the first to third embodiments described above can also be realized with a computer with an external auxiliary storage device such as a hard disk or a CD-R loaded therein. In this case, the digital contents copying-inhibition method according to the first to third embodiment can be realized as a computer program.

As described above, with the present invention, it is possible to physically restrict illegal contents of digital contents such as music pieces, images and programs and also to effectively restrict use of the digital contents once copied by a method different from the conventional ID authorization technology and ciphering technology. Further, it is possible to insure security for digital contents prepared by the method.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital contents copying-inhibition apparatus comprising:
    a guard data storage section which stores guard data, the guard data being appendable to audio or video digital data, the audio or video digital data being expressable as an amplitude of a frequency component, and wherein a presence of the guard data becomes audibly apparent to a user only when the audio or video digital data is reproduced after the audio or video digital data with the guard data appended thereto has been compressed;
    a peak detection section which identifies a position of a digital value having a prespecified increase rate and a prespecified amplitude among a plurality of digital values each constituting a portion of the digital data;
    a data analysis section which sets a flag for a digital value located at a position away from the peak position by a prespecified number and also sets a plurality of digital values within a prespecified range centering on the digital value for which the flag has been set as a data pattern; and
    a guard data appending section which identifies positions where the data pattern is located from the digital data and varies the digital data by appending the guard data to the identified positions,
    wherein the guard data is expressed as digital audio data with a small sound volume change rate and a high frequency, and the guard data is appended to a section of the digital data with a small sound volume immediately behind a portion with a large sound volume.

2. The digital contents copying-inhibition apparatus according to claim 1, wherein said guard data appending section appends, each time a position where the data pattern is located is identified from the digital data, different guard data at the identified position.

3. The digital contents copying-inhibition apparatus according to claim 1 further comprising a guard emphasizing data appending section which appends guard emphasizing data having a first frequency component not sensed in reproduction of the digital data, wherein
    said guard data appending section appends the guard data to a data section having a frequency component equal to a half of the first frequency component.

4. A digital contents copying-inhibition apparatus according to claim 1, further comprising:
    an encoding position identifying section which receives first digital code indicating at least one digital value among a plurality of digital values each constituting the digital data and identifies a digital value to be encoded among the digital values based on the received first digital code; and
    an encoding section which receives second digital code and varies the digital data by appending the digital value indicated by the second digital code to a digital value at the position identified by said encoding position identifying section, wherein the encoding position identifying section receives a third digital code indicating a type of the digital data and changes a retrieval range for identifying the digital value to be encoded based on the received third digital code.

5. The digital contents copying-inhibition apparatus according to claim 1, wherein the guard data appended to the digital data causes an audio distortion in an unauthorized reproduction of the audio or video digital data.

6. The digital contents copying-inhibition apparatus according to claim 1, wherein the identified position is based on a result of a psychological auditory sense assay.

7. The digital contents copying-inhibition apparatus according to claim 4, wherein said encoding section changes a value of the eighth bit of the digital value at the position identified by said encoding position identifying section to "1" when the type of digital data indicated by the third digital code is a program.

8. A reproducible recording medium in which the digital data processed by a digital contents copying-inhibition apparatus is recorded therein, wherein said digital contents copying-inhibition apparatus comprising:
    a guard data storage section which stores guard data, the guard data being appendable to audio or video digital data, the audio or video digital data being expressable as an amplitude of a frequency component, and wherein a presence of the guard data becomes audibly apparent to a user only when the audio or video digital data is reproduced after the audio or video digital data with the guard data appended thereto has been compressed;
    a peak detection section which identifies a position of a digital value having a prespecified increase rate and a prespecified amplitude among a plurality of digital values each constituting a portion of the digital data;

a data analysis section which sets a flag for a digital value located at a position away from the peak position by a prespecified number and also sets a plurality of digital values within a prespecified range centering on the digital value for which the flag has been set as a data pattern; and a guard data appending section which identifies positions where the data pattern is located from the digital data and varies the digital data by appending the guard data to the identified positions, wherein the guard data is expressed as digital audio data with a small sound volume change rate and a high frequency, and the guard data is appended to a section of the digital data with a small sound volume immediately behind a portion with a large sound volume.

9. A reproducible recording medium according to claim 7, further comprising:

an encoding position identifying section which receives first digital code indicating at least one digital value among a plurality of digital values each constituting the digital data and identifies a digital value to be encoded among the digital values based on the received first digital code; and an encoding section which receives second digital code and varies the digital data by appending the digital value indicated by the second digital code to a digital value at the position identified by said encoding position identifying section, wherein the encoding position identifying section receives a third digital code indicating a type of the digital data and changes a retrieval range for identifying the digital value to be encoded based on the received third digital code.

10. A digital contents copying-inhibition method comprising:

detecting a digital data peak position, wherein a position of a digital value having a prespecified increase rate and a prespecified amplitude is identified among a plurality of digital values each constituting digital data including audio or video digital data that is expressable as an amplitude of a frequency component of the audio or video digital data;

setting a flag for a digital value present at a position away from said peak position by a prespecified amount and a plurality of digital values within a prespecified range centering on the digital value for which the flag has been set as a data pattern; and appending a guard data to the digital data at the identified position, wherein the presence the guard data is sensed in reproduction only after the digital data is appended and compressed, wherein the guard data is expressed as digital audio data with a small sound volume change rate and a high frequency, and the guard data is appended to a section of the digital data with a small sound volume immediately behind a portion with a large sound volume in the guard data appending step.

11. The digital contents copying-inhibition method according to claim 10, wherein, in said guard data appending step, different guard data is appended, each time a position where the data pattern is located is identified from the digital data, to the identified position.

12. A digital contents copying-inhibition method according to claim 10 further comprising a guard emphasizing data appending step in which guard emphasizing data having a first frequency component not sensed in reproduction of the digital data is appended to said digital data, wherein, in the guard data appending step, the guard data is appended to a data section having a frequency component which is equal to a half of the first frequency component in the digital data.

13. A digital contents copying-inhibition method according to claim 10, further comprising:

identifying an encoding position in which, of a plurality of digital values each constituting the digital data, first digital code indicating at least one digital data is received and a digital value to be encoded is identified among the plurality of digital data based on the received first digital code;

encoding the digital data, wherein second digital code is received and the digital data is modified by appending the digital value indicated by the second digital code to a digital value at the position identified in the encoding position identifying step, and wherein third digital code is received indicating a type of the digital data; and modifying the digital value to be encoded based on the received third digital code.

14. The digital contents copying-inhibition method according to claim 13, wherein, in said encoding the digital data step, when the type of digital data indicated by the third digital code is a program, the eight bit of the digital value at the position identified by said encoding position identifying step is changed to "1".

15. A reproducible recording medium in which digital data processing using a digital contents copying-inhibition method is recorded, the digital contents copying-inhibition method comprising:

detecting a digital data peak position, wherein a position of a digital value having a prespecified increase rate and a prespecified amplitude is identified among a plurality of digital values each constituting digital data including audio or video digital data that is expressable as an amplitude of a frequency component of the audio or video digital data;

setting a flag for a digital value present at a position away from said peak position by a prespecified amount and a plurality of digital values within a prespecified range centering on the digital value for which the flag has been set as a data pattern; and appending a guard data to the digital data at the identified position, wherein the presence of the guard data is sensed in reproduction only after the digital data is appended and compressed, wherein the guard data is expressed as digital audio data with a small sound volume change rate and a high frequency, and the guard data is appended to a section of the digital data with a small sound volume immediately behind a portion with a large sound volume in the guard data appending step.

16. A reproducible recording medium according to claim 15, further comprising:

identifying an encoding position in which, of a plurality of digital values each constituting the digital data, first digital code indicating at least one digital data is received and a digital value to be encoded is identified among the plurality of digital data based on the received first digital code;

encoding the digital data, wherein second digital code is received and the digital data is modified by appending the digital value indicated by the second digital code to a digital value at the position identified in the encoding position identifying step, and wherein third digital code is received indicating a type of the digital data; and modifying the digital value to be encoded based on the received third digital code.

17. A computer-readable recording medium in which a program for making a computer execute a digital contents copying-inhibition method is recorded, the digital contents copying-inhibition method comprising:

detecting a digital data peak position, wherein a position of a digital value having a prespecified increase rate and a prespecified amplitude is identified among a plurality of digital values each constituting digital data including audio audio or video digital data that is expressable as an amplitude of a frequency component of the audio or video digital data;

setting a flag for a digital value present at a position away from said peak position by a prespecified amount and a plurality of digital values within a prespecified range centering on the digital value for which the flag has been set as a data pattern; and appending a guard data to the digital data at the identified position, wherein the presence of the guard data is sensed in reproduction only after the digital data is appended and compressed, to the identified position, wherein the guard data is expressed as digital audio data with a small sound volume change rate and a high frequency, and the guard data is appended to a section of the digital data with a small sound volume immediately behind a portion with a large sound volume in the guard data appending step.

18. A computer-readable recording medium according to claim 17, further comprising:

identifying an encoding position in which, of a plurality of digital values each constituting the digital data, first digital code indicating at least one digital data is received and a digital value to be encoded is identified among the plurality of digital data based on the received first digital code; and encoding the digital data, wherein second digital code is received and the digital data is modified by appending the digital value indicated by the second digital code to a digital value at the position identified in the encoding position identifying step, and wherein third digital code is received indicating a type of the digital data; and modifying the digital value to be encoded by the received third digital code.

* * * * *